US009582750B2

(12) United States Patent
Forster

(10) Patent No.: US 9,582,750 B2
(45) Date of Patent: Feb. 28, 2017

(54) RFID DEVICES WITH MULTI-FREQUENCY ANTENNAE

(71) Applicant: Avery Dennison Retail Information Services, LLC, Mentor, OH (US)

(72) Inventor: Ian James Forster, Chelmsford/Essex (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/578,526

(22) Filed: Dec. 22, 2014

(65) Prior Publication Data

US 2016/0180213 A1    Jun. 23, 2016

(51) Int. Cl.
| | |
|---|---|
| *G06K 19/06* | (2006.01) |
| *G06K 19/077* | (2006.01) |
| *H01Q 21/30* | (2006.01) |
| *H01Q 1/22* | (2006.01) |
| *H01Q 9/28* | (2006.01) |

(52) U.S. Cl.
CPC ... *G06K 19/07786* (2013.01); *G06K 19/0779* (2013.01); *G06K 19/07767* (2013.01); *G06K 19/07794* (2013.01); *H01Q 1/2225* (2013.01); *H01Q 9/285* (2013.01); *H01Q 21/30* (2013.01)

(58) Field of Classification Search
CPC ....... G06K 19/07749; G06K 19/07786; G06K 19/07767; G06K 19/0723; G06K 19/0724; G06K 19/07773; G06K 19/07779; G06K 19/07783; H01Q 1/38; H01Q 9/285; H01Q 9/20; H01Q 21/30

USPC ........................................................ 235/492
See application file for complete search history.

(56) References Cited

U.S. PATENT DOCUMENTS

| | | | | | |
|---|---|---|---|---|---|
| 4,622,559 | A | * | 11/1986 | Shafai | H01Q 13/065 |
| | | | | | 343/786 |
| 5,973,600 | A | * | 10/1999 | Mosher, Jr. | G06K 19/077 |
| | | | | | 340/572.1 |
| 6,100,788 | A | * | 8/2000 | Frary | G06K 19/07749 |
| | | | | | 340/10.1 |

(Continued)

OTHER PUBLICATIONS

International Search Report and Written Opinion dated Apr. 12, 2016 for International Application PCT/US2015/066582.

*Primary Examiner* — Claude J Brown
(74) *Attorney, Agent, or Firm* — Avery Dennison Retail Information Services, LLC

(57) ABSTRACT

An RFID device includes a conductive sheet defining at least first and second portions, with an intermediate portion joining the other portions. One or more RFID chips electrically coupled to the portions, such as one or both of the first and second portions of the conductive sheet and to the intermediate portion. The first portion of the conductive sheet defines a multi-turn high frequency antenna having one or more disruptions in the conductive sheet positioned between and/or defining adjacent turns of the multi-turn antenna. The second portion of the conductive sheet defines a first radiating arm of an ultra high frequency antenna. The disruptions direct a high frequency current around the turns of the multi-turn high frequency antenna, while allowing an ultra high frequency current to flow across the disruptions, resulting in the first portion of the conductive sheet defining a second radiating arm of the ultra high frequency antenna.

14 Claims, 1 Drawing Sheet

(56) References Cited

U.S. PATENT DOCUMENTS

| | | |
|---|---|---|
| 8,174,454 B2 | 5/2012 | Mayer |
| 8,646,695 B2 | 2/2014 | Worrall et al. |
| 2003/0080919 A1* | 5/2003 | Forster .................... B60C 23/04 343/895 |
| 2009/0079568 A1* | 3/2009 | Forster ............. G06K 19/07749 340/572.1 |
| 2010/0026439 A1 | 2/2010 | Qing et al. |
| 2010/0103058 A1* | 4/2010 | Kato ................ G06K 19/07749 343/702 |
| 2011/0068987 A1 | 3/2011 | Carr |
| 2011/0084888 A1* | 4/2011 | Nishioka .................. H01Q 5/35 343/728 |
| 2011/0090058 A1* | 4/2011 | Ikemoto ................... H01Q 5/35 340/10.1 |
| 2011/0156864 A1 | 6/2011 | Green |
| 2012/0235870 A1 | 9/2012 | Forster |
| 2013/0020114 A1* | 1/2013 | Koshimizu ......... H01L 21/4867 174/257 |
| 2013/0050047 A1* | 2/2013 | Carr ....................... H01Q 1/248 343/853 |
| 2013/0052953 A1 | 2/2013 | Rofougaran |
| 2013/0249301 A1 | 9/2013 | Smoot et al. |
| 2014/0008446 A1 | 1/2014 | Carr |
| 2014/0008447 A1 | 1/2014 | Deavours et al. |

* cited by examiner

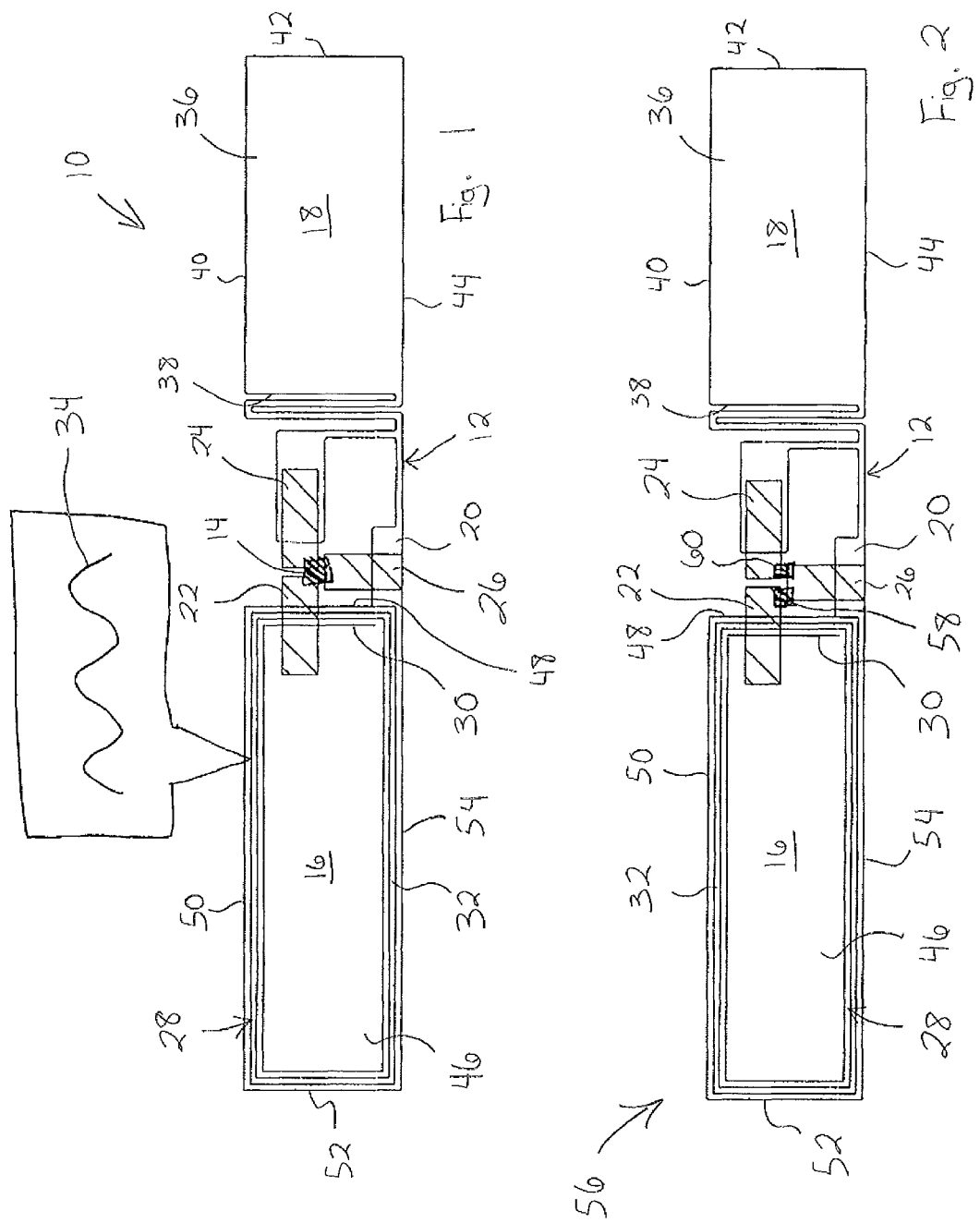

RFID DEVICES WITH MULTI-FREQUENCY ANTENNAE

BACKGROUND

Field of the Disclosure

The present subject matter relates to radio frequency identification ("RFID") devices. More particularly, the present subject matter relates to RFID devices having antennae configured to operate at different frequencies.

Description of Related Art

RFID tags and labels are widely used to associate an object with an identification code. RFID tags and labels generally have a combination of antennae and analog and/or digital electronics, which may include, for example, communications electronics, data memory, and control logic. In many applications it is desirable to employ an RFID device that operates in multiple frequency bands such as high frequencies, which may be on the order of approximately 13.56 MHz, and ultra high frequencies, which may be on the order of approximately 865-868 MHz or approximately 902-928 MHz. Exemplary RFID devices incorporating dual-frequency antennae are described in U.S. Patent Application Publication No. 2012/0235870 to Forster, which is hereby incorporated herein by reference.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In a general aspect, an RFID device embodies conductor structures that establish different paths for the flow of radiofrequency (RF) current for different frequencies, providing efficient multi-frequency antennas. A single such RFID chip operates at multiple different frequencies. Embodiments utilize modifications to the antenna structure, such as using gaps, thinned areas, additive materials or other modifications. Particular embodiments are dual-input RFID chips that are capable of receiving two different frequency inputs, allowing for operation of a single RFID chip at two different frequencies, or separate single-input RFID chips operable at different frequency inputs and both associated with a multi-frequency antenna.

In one aspect, an RFID device includes a conductive sheet defining first and second portions, with an intermediate portion joining the first and second portions. A dual-input RFID chip is configured to receive high frequency inputs and ultra high frequency inputs and electrically coupled to the first portion of the conductive sheet by a first connection, to the second portion by a second connection, and to the intermediate portion by a third connection. The first portion of the conductive sheet defines a multi-turn high frequency antenna having one or more disruptions in the conductive sheet positioned between and/or defining adjacent turns of the multi-turn antenna, while the second portion of the conductive sheet defines a first radiating arm of an ultra high frequency antenna. The one or more disruptions in the first portion of the conductive sheet are configured to reduce the conductivity of the conductive sheet at the location of the one or more disruptions to a low enough level so as to direct a high frequency current around the turns of the multi-turn high frequency antenna rather than across the one or more disruptions, while allowing an ultra high frequency current to flow across the one or more disruptions, thereby resulting in the first portion of the conductive sheet defining a second radiating arm of the ultra high frequency antenna.

In another aspect, an RFID device includes a conductive sheet defining first and second portions, with an intermediate portion joining the first and second portions. A high frequency-input RFID chip is electrically coupled to the first portion of the conductive sheet by a first connection, while an ultra high frequency-input RFIP chip is electrically coupled to the second portion of the conductive sheet by a second connection. Both RFID chips are electrically coupled to the intermediate portion of the conductive sheet by a third connection. The first portion of the conductive sheet defines a multi-turn high frequency antenna having one or more disruptions in the conductive sheet positioned between and/ or defining adjacent turns of the multi-turn antenna, while the second portion of the conductive sheet defines a first radiating arm of an ultra high frequency antenna. The one or more disruptions in the first portion of the conductive sheet are configured to reduce the conductivity of the conductive sheet at the location of the one or more disruptions to a low enough level so as to direct a high frequency current around the turns of the multi-turn high frequency antenna rather than across the one or more disruptions, while allowing an ultra high frequency current to flow across the one or more disruptions, thereby resulting in the first portion of the conductive sheet defining a second radiating arm of the ultra high frequency antenna.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 1 is a top plan view of an RFID device according to an aspect of the present disclosure; and FIG. 2 is a top plan view of an alternative embodiment of an RFID device according to an aspect of the present disclosure.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

FIG. 1 shows an exemplary RFID device 10, such as an RFID tag or strap, according to an aspect of the present disclosure following a multi-frequency approach. The illustrated RFID device 10 includes at least a conductive sheet or layer 12 and an RFID chip 14 electrically coupled to the conductive sheet 12. The RFID device 10 may include additional components without departing from the scope of the present disclosure, such as a non-conductive substrate layer with one or more conductive mounting pads secured thereto. In such an embodiment, the RFID chip 14 may be electrically coupled to both the conductive sheet 12 and the mounting pads, with the conductive sheet 12 substantially parallel to the mounting pads.

The conductive sheet 12 defines a first portion 16, a second portion 18, and an intermediate portion 20, with the intermediate portion 20 joining the first and second portions 16 and 18. The first and second portions 16 and 18 serve as antennae or components of an antenna during use of the RFID device 10, so it may be advantageous for them to relatively large (larger than the intermediate portion 20) for improved antenna performance and durability. The conductive sheet 12 may be formed of a metallic material (e.g., a thin aluminum film) or any other suitable conductive material or materials. Ideally the conductive material should be one skin depth at the lowest frequency that a portion of the antenna needs to operate; for example, if the coil element 18 is designed to operate at 13.56 MHz, the thickness for aluminum should be 22.3 um of greater, although lower thicknesses can be used for reasons of cost and ease of manufacturability. Preferably, the conductive sheet 12 is substantially flat or planar, but it is also within the scope of the present disclosure for the conductive sheet 12 to be non-planar. The first and second portions 16 and 18 are illustrated as being generally rectangular, but it is also within the scope of the present disclosure for one or both of the first and second portions 16 and 18 to be non-rectangular. Additionally, while FIG. 1 shows the first portion 16 of the conductive sheet 12 as being larger than the second portion 18, it is within the scope of the present disclosure for the two portions 16 and 18 to be substantially the same size or for the second portion 18 to be larger than the first portion 16.

The RFID chip 14 is electrically coupled to the first portion 16 of the conductive sheet 12 by a first connection 22, to the second portion 18 of the conductive sheet 12 by a second connection 24, and to the intermediate portion 20 of the conductive sheet 12 by a third connection 26. The connections between the RFID chip 14 and the conductive sheet 12 may take any of a number of forms. For example, in one embodiment, the RFID chip 14 is electrically coupled to the conductive sheet 12 by a conductive connection, such as one formed using a conductive adhesive. In another embodiment, the RFID chip 14 may be electrically coupled to the conductive sheet 12 by one or more welds, formed via an electrical current or a laser or ultrasonic or any other suitable method.

In yet another embodiment, the RFID chip 14 is electrically coupled to the conductive sheet 12 by a capacitive connection, such as when a layer of adhesive (which may be a non-conductive adhesive) is applied between the RFID chip 14 and the conductive sheet 12, with the adhesive layer being sufficiently thin that parallel plate capacitance between mounting pads associated with the RFID chip 14 and the conductive sheet 12 passes current there between. In embodiments employing a capacitive connection, it may be advantageous for there to be a relatively large capacitance, in which case a relatively thin layer of adhesive may be used (especially in the first portion 16 of the conductive sheet 12, where high frequency current is passed, as will be described in greater detail) and/or an adhesive with a relatively high dielectric constant may be employed.

In one embodiment, the RFID chip 14 is electrically coupled to the various portions of the conductive sheet 12 using the same method or mechanism to simplify the manufacturing process, but it is within the scope of the present disclosure for the RFID chip 14 to be electrically coupled to two different portions of the conductive sheet 14 by different methods and/or mechanisms, including by those methods and/or mechanisms discussed herein.

The RFID chip 14 is configured to receive both high frequency ("HF") and ultra high frequency ("UHF") inputs. As described above, high frequency inputs may be on the order of approximately 13.56 MHz or below 30 MHz, while ultra high frequencies by be on the order of approximately 865-868 MHz or approximately 902-928 MHz or above 300 MHz. It should be understood that the present disclosure is not limited to a dual-input RFID chip 14 capable of operating at only a particular pair of frequencies or bands of frequencies, but generally encompasses any RFID chip 14 configured to be active upon exposure to both a lower frequency input and a higher frequency input, with the higher frequency input having a frequency at least an order of magnitude greater than the frequency of the lower frequency input. In an alternative embodiment, the composite structure of 16 and 18 may act as a far field antenna at a UHF frequency, and the element 16 may operate as a near field antenna. Although a number of mathematical definitions are available for near and far field, for illustration we may consider near field and being equal to or below one wavelength at the operating frequency and the far field as being greater than one wavelength.

The conductive sheet 12 is configured to act as an antenna that transmits and/or receives signals based on the input received by the RFID chip 14. As the RFID chip 14 is configured to process both HF and UHF inputs, for example, the conductive sheet 12 acts as an integrated multi-frequency antenna. This may be achieved as follows.

RFID devices operating with HF signals typically operate in the near field region and, with powers allowed by regulations, at relatively short range. The operation of such devices at close range is beneficial in terms of penetration of dielectric materials and for security purposes. Operation of such devices is typically achieved using magnetic coupling between an RFID device or tag and a reader antenna, with a common antenna taking the form of a multi-turn coil. In the embodiment of FIG. 1, at least a section of the first portion 16 of the conductive sheet 12 defines a multi-turn antenna 28 that is capable of receiving and/or transmitting HF signals. In the illustrated embodiment, the section of the first portion 16 of the conductive sheet 12 adjacent to the perimeter of the first portion 16 includes one or more disruptions or sections of decreased conductivity 30 (shown as a single solid, spiraling line), with the one or more disruptions 30 positioned between and/or defining the turns 32 of a multi-turn HF antenna 28. The one or more disruptions 30 are configured (e.g., by being sufficiently large) to reduce the conductivity of the conductive sheet 12 at that location to a low enough level that an HF current is forced to travel around the turns 32 of the multi-turn HF antenna 28 defined by or between the disruption(s) 30, rather than allowing the HF current to cross the disruption(s) 30.

The one or more disruptions 30 may be variously configured without departing from the scope of the present disclosure, provided that they are configured to direct an HF current around the turns 32 of the multi-turn HF antenna 28 that is defined in the first portion 16 of the conductive sheet 12. For example, in one embodiment, the one or more disruptions 30 are one or more openings passing through the first portion 16 of the conductive sheet 12. Such openings may be formed by any suitable method, such as laser-cutting or etching or the like. In another embodiment, the one or more disruptions 30 are one or more thinned areas of the first portion 16 of the conductive sheet 12. In yet another embodiment, the one or more disruptions 30 are areas of the first portion 16 of the conductive sheet 12 to which one or more additive materials have been applied (e.g., by a printing process) to decrease the conductivity of the conductive sheet 12 thereat. It should be understood that the foregoing methods and means for directing an HF current around the turns 32 of a multi-turn HF antenna 28 are merely exemplary, and other methods and mechanisms for decreasing the conductivity of particular sections of the first portion 16 of the conductive sheet 12 may also be employed without departing from the scope of the present disclosure. Additionally, it is within the scope of the present disclosure for two or more differently configured disruptions 30 to be employed, such as an opening in one section of the conductive sheet 12 and a thinned area elsewhere.

For the portion 16 to act as far as possible as a continuous conductor at UHF frequencies, it is desirable to couple the elements of the coil together as strongly as possible. A capacitance exists between the turn of the coil, dependent on the gap, the thickness of the conductor, the dielectric constant of the material and the length of the interaction between adjacent lines. This capacitance has a relatively low impedance at UHF, and a relatively high impedance at HF, so that the turns at UHF are relatively strongly coupled and therefore behave more like a continuous conductor enhancing the effectiveness of area 16 as part of the UHF antenna. According to one method of directing HF current around the turns 32 of a multi-turn HF antenna 28, at least a section of the one or more disruptions 30 may define a generally sinusoidal pattern 34 in a plane defined by the conductive sheet 12 to increase the coupling length and hence capacitance between adjacent turns 32 of the multi-turn HF antenna 28 or to otherwise decrease the conductivity of a path between adjacent turns 32 passing through the disruption(s) 30. It should be understood that, in the illustrated embodiment, the one or more disruptions 30 combine to define a generally spiral pattern, but that they may have the pictured sinusoidal pattern 34 locally when examined under greater magnification. In addition to the illustrated sinusoidal pattern, the one or more disruptions 30 may have a different local pattern or shape that is non-linear to increase the coupling between adjacent turns 32 of the multi-turn HF antenna 28 positioned between or defined by the one or more disruptions 30 or to otherwise decrease the conductivity of a path between adjacent turns 32 passing through the disruption(s) 30.

In contrast to RFID devices operating with HF signals, RFID devices operating with UHF signals can operate in both near and far field modes. The operation of such devices at long range is beneficial in terms of allowing a large number of such devices to be identified in an area, which has numerous applications, including performing an inventory of tagged products in a merchandise storage and/or display area (e.g., in a warehouse or showroom). Operation of such devices may be made possible by a modified dipole having a pair of radiating arms. In the embodiment of FIG. 1, at least a section of the second portion 18 of the conductive sheet 12 defines one radiating arm 36 of a UHF antenna. A UHF current may flow directly across the second portion 18 of the conductive sheet 12 in a horizontal direction or in a plane defined by the conductive sheet 12 (e.g., directly between an inner edge or side 38 of the second portion 18 and one of the outer edges or sides 40, 42, 44 of the second portion 18) to transmit and/or receive a UHF signal.

The first portion 16 of the conductive sheet 12 provides the other radiating arm 46 of a UHF antenna. In contrast to an HF current, a UHF current is capable of passing or crossing the one or more disruptions 30, rather than being directed along a spiral path by the one or more disruptions 30. Accordingly, a UHF current may flow across the first portion 16 of the conductive sheet 12 in substantially the same way that it flows across the second portion 18, i.e., in a horizontal direction or in a plane defined by the conductive sheet 12 (e.g., directly between an inner edge or side 48 of the first portion 16 and one of the outer edges or sides 50, 52, 54 of the first portion 16, across the one or more disruptions 30). The first portion 16 of the conductive sheet 12 thereby provides both a multi-turn HF antenna 28 and a radiating arm 46 of a UHF antenna.

The most advantageous configuration of the one or more disruptions 30 (in terms of defining the turns 32 a multi-turn HF antenna 28 while allowing cross-coupling at a UHF current) may vary depending on a number of factors. For example, the optimal configuration may depend upon the frequencies at which the RFID device 10 is to operate, such that the preferred nature, width, and/or local pattern or shape for two RFID devices operating at different frequencies may be different. Other factors may include the material composition of the conductive sheet 12 and/or the thickness of the conductive sheet 12.

FIG. 2 illustrates an alternative embodiment of an RFID device 56 according to the present disclosure. The RFID device 56 of FIG. 2 may be provided according to the foregoing description of the RFID device 10 of FIG. 1, except for the inclusion of two RFID chips 58 and 60 instead of a single dual-input RFID chip 14 of the FIG. 1 embodiment. In particular, the RFID device 56 of FIG. 2 includes a high frequency-input RFID chip 58 and an ultra high frequency-input RFID chip 60. The two RFID chips 58 and 60 essentially share the function performed by the dual-input RFID chip 14 of FIG. 1, with the high frequency-input RFID chip 58 configured to receive a lower frequency input (e.g., a HF input) and the ultra high frequency-input RFID chip 60 configured to receive a higher frequency input (e.g., a UHF input). Similar to the embodiment of FIG. 1, three connections 22, 24, and 26 are provided to electrically couple the RFID chips 58 and 60 to the conductive sheet 12, with the first connection 22 being between the high frequency-input RFID chip 58 and the first portion 16 of the conductive sheet 12, the second connection 24 being between the ultra high frequency-input RFID chip 60 and the second portion 18 of the conductive sheet 12, and the third connection 26 being between the intermediate portion 20 of the conductive sheet 12 and the two RFID chips 58 and 60. Depending on the frequency of an input to the RFID device 56, only one of the RFID chips 58, 60 may be active, whereas the same RFID chip 14 is active at two different frequencies or frequency ranges in the embodiment of FIG. 1 but, otherwise, the RFID device 56 of FIG. 2 operates according to the foregoing description of the RFID device 10 of FIG. 1.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

The invention claimed is:

1. An RFID device, comprising:
a conductive sheet defining first and second portions, with an intermediate portion joining the first and second portions;
a dual-input RFID chip configured to receive high frequency inputs and ultra high frequency inputs;
a first connection electrically coupling the first portion of the conductive sheet and the RFID chip;
a second connection electrically coupling the second portion of the conductive sheet and the RFID chip; and
a third connection electrically coupling the intermediate portion of the conductive sheet and the RFID chip, such that at least one of the connections comprises a conductive connection via a conductive adhesive, wherein
the first portion of the conductive sheet defines a multi-turn high frequency antenna having one or more disruptions in the conductive sheet positioned between and/or defining adjacent turns of the multi-turn high frequency antenna,
the second portion of the conductive sheet defines a first radiating arm of an ultra high frequency antenna, and
the one or more disruptions in the first portion of the conductive sheet comprise one or more openings in the conductive sheet and are configured to reduce the conductivity of the conductive sheet at the location of the one or more disruptions to a low enough level so as to direct a high frequency current around the turns of the multi-turn high frequency antenna rather than across the one or more disruptions, while allowing an ultra high frequency current to flow across the one or more disruptions, thereby resulting in the first portion of the conductive sheet defining a second radiating arm of the ultra high frequency antenna and at least a section of the one or more disruptions in the first portion of the conductive sheet defines a generally sinusoidal local pattern in a plane defined by the conductive sheet.

2. The RFID device of claim 1, wherein said one or more disruptions in the first portion of the conductive sheet comprise one or more thinned areas of the conductive sheet.

3. The RFID device of claim 1, wherein said one or more disruptions in the first portion of the conductive sheet comprise one or more additive materials applied to the conductive sheet to decrease the conductivity of the conductive sheet at the location or locations of said one or more disruptions.

4. The RFID device of claim 1, wherein at least one of the connections comprises a weld.

5. The RFID device of claim 1, wherein at least one of the connections comprises a capacitive connection with a non-conductive adhesive.

6. An RFID device, comprising:
a conductive sheet defining first and second portions, with an intermediate portion joining the first and second portions;
a high frequency-input RFID chip;
an ultra high frequency-input RFID chip;
a first connection electrically coupling the first portion of the conductive sheet and the high frequency RFID chip;
a second connection electrically coupling the second portion of the conductive sheet and the ultra high frequency-input RFID chip; and
a third connection electrically coupling the intermediate portion of the conductive sheet and the RFID chips, wherein
the first portion of the conductive sheet defines a multi-turn high frequency antenna having one or more disruptions in the conductive sheet positioned between and/or defining adjacent turns of the multi-turn high frequency antenna, said one or more disruptions in the first portion of the conductive sheet comprise one or more thinned areas of the conductive sheet,
the second portion of the conductive sheet defines a first radiating arm of an ultra high frequency antenna, and
the one or more disruptions in the first portion of the conductive sheet are configured to reduce the conductivity of the conductive sheet at the location of the one or more disruptions to a low enough level so as to direct a high frequency current around the turns of the multi-turn high frequency antenna rather than across the one or more disruptions, while allowing an ultra high frequency current to flow across the one or more disruptions, thereby resulting in the first portion of the conductive sheet defining a second radiating arm of the ultra high frequency antenna.

7. The RFID device of claim 6, wherein said one or more disruptions in the first portion of the conductive sheet comprise one or more openings in the conductive sheet.

8. The RFID device of claim 7, wherein at least a section of said one or more disruptions in the first portion of the conductive sheet defines a generally sinusoidal local pattern in a plane defined by the conductive sheet.

9. The RFID device of claim 6, wherein at least a section of said one or more disruptions in the first portion of the conductive sheet defines a generally sinusoidal local pattern in a plane defined by the conductive sheet.

10. The RFID device of claim 6, wherein said one or more disruptions in the first portion of the conductive sheet comprise one or more additive materials applied to the conductive sheet to decrease the conductivity of the conductive sheet at the location or locations of said one or more disruptions.

11. The RFID device of claim 10, wherein at least a section of said one or more disruptions in the first portion of the conductive sheet defines a generally sinusoidal local pattern in a plane defined by the conductive sheet.

12. The RFID device of claim 6, wherein at least one of the connections comprises a conductive connection via a conductive adhesive.

13. The RFID device of claim 6, wherein at least one of the connections comprises a weld.

14. The RFID device of claim 6, wherein at least one of the connections comprises a capacitive connection with a non-conductive adhesive.

* * * * *